May 23, 1961 G. H. MEIER 2,985,022
GYROSCOPIC DEVICE
Filed Nov. 3, 1959
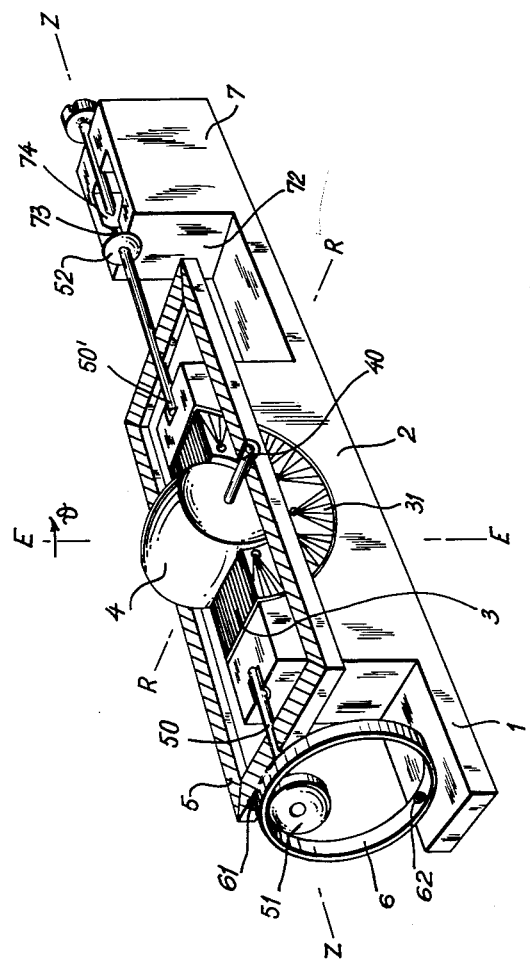
INVENTOR.
GHERT HENRI MEIER
BY
*Michael S. Striker*
ATTORNEY United States Patent Office 2,985,022
Patented May 23, 1961

2,985,022
GYROSCOPIC DEVICE
Ghert Henri Meier, Zurich, Switzerland, assignor to Contraves A.G., Zurich, Switzerland
Filed Nov. 3, 1959, Ser. No. 850,600
Claims priority, application Switzerland Nov. 4, 1958
4 Claims. (Cl. 74—5.7)

The present invention relates to a gyroscopic device. More particularly, the present invention relates to a gyroscopic device for measuring angular velocity. Such devices comprise a gyroscopic rotor which is driven at constant speed and which is mounted in a gimbal frame. The latter is mounted for turning movement about an indicating axis on a support the angular velocity of which is to be measured, about an axis of sensitivity which is normal to the plane defined by axis of rotation of the rotor and the turning axis of the gimbal frame, suitable biasing means being provided for maintaining the gimbal frame in a normal rest position.

The sensitivity of such a gyroscopic system is determined primarily by the angular momentum of the gyroscopic rotor, i.e., the product $\theta v$ where $\theta$ is the moment of inertia of the rotating mass with respect to the rotor axis and $v$ is the rotor speed. As in all mechanical indicating systems, the inertia and the indicating accuracy of such gyroscopic system is determined, in addition to the damping, by characteristic frequency $\omega_0$ of the system with respect to the oscillation about the indicating axis. To improve the fidelity of the system, the characteristic frequency should be as high as possible. But inasmuch as the square of the characteristic frequency $\omega_0^2$ is proportional to $\theta v/J$, where $J$ is the moment of inertia of the mass which turns about the indicating axis with respect to this axis, the angular momentum $\theta v$ should be selected to be as large as possible and this last-mentioned moment of inertia should be selected to be as small as possible. This means that the gimbal frame should be made as small and as light as possible. The same holds true for the transducer control element which is generally mounted on the indicating axis. Such transducers may be so arranged that the angular displacement $\alpha$ of the indicating axis is transformed into a proportionately large electrical measuring or control quantity which can then be used to actuate appropriate servomechanisms that counteract the forces which brought about the angular displacement.

In known gyroscopic systems of this type, the rotor is driven by a hysteresis motor comprising an interior stator and an exterior rotary armature ring which constitutes the gyroscopic rotor of the system. It is true that in such a gyroscope the moment of inertia $\theta$ of the rotor is relatively large, so that even at relatively low speed the desired angular momentum is obtained. But this advantage carries with it a number of disadvantages. A substantial part of the mass of the rotor ring is responsible for increasing the moment of inertia $J$ relative to the indicating axis, and this decreases the indicating accuracy of the measuring system. Furthermore, the mass of the motor stator adds nothing to the angular momentum, instead, it increases the objectionable moment of inertia. This makes it necessary to fashion the gimbal frame sufficiently strong to enable it to withstand the stresses that take place when the rotor is accelerated. Moreover, such an arrangement makes it necessary for the gimbal frame to be built sufficiently large so that it is able to accommodate the rotor ring, i.e., the frame must be designed with due consideration being given to the outside diameter of the rotor ring. All of these factors contribute to increase the harmful and undesirable moment of inertia with respect to the indicating axis.

It is therefore an object of the present invention to provide a gyroscopic device which overcomes the above disadvantages.

It is another object of the present invention to provide a gyroscopic measuring device which is of simple and rugged construction and which will give long periods of trouble-free service.

The objects of the present invention also includes the provision of a gyroscopic measuring device which is very sensitive and gives accurate results.

With the above objects in view, the present invention resides mainly in a gyroscopic device the rotor of which is constituted by a substantially barrel-shaped electric rotor that is arranged interiorly of the stator of the hysteresis motor, which stator is rigidly connected to the support of the measuring device.

More particularly, the present invention resides in a gyroscopic device for measuring angular velocity, which device comprises a support the angular velocity of which about a predetermined axis of sensitivity is to be measured, a gimbal frame mounted on the support for pivotal movement relative thereto about an indicating axis normal to the axis of sensitivity, biasing means interposed between the support and the gimbal frame for urging the latter into a rest position, and a hysteresis motor having a stator and a rotor, the stator being rigidly connected to the support and the rotor constituting the gyroscopic rotor of the device and being mounted interiorly of the stator for rotation about an axis of rotation which is normal to the plane defined by the indicating axis and the axis of sensitivity. According to the present invention, the rotor is substantially barrel-shaped so as to allow it to pivot together with the gimbal frame about an indicating axis.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawings, in which the single figure is a perspective view of a gyroscopic device according to the present invention. In order to facilitate illustration of the device, only half of the gimbal frame and only those stationary parts which are below the plane of the frame are shown.

Referring now to the drawing, there is shown a base plate 1 and block 2, these parts together constituting the support whose angular velocity about the axis of sensitivity E is to be measured.

The device further comprises a hysteresis motor having a stator 3 and a rotor 4, the latter to be referred to later. The stator 3 is composed of annular soft iron laminations which are built into the block 2, this stator being in the form of a Gramme ring having wire windings 31 extending in axial planes, the inner portions of which windings pass through axially directed openings arranged about the inner periphery of the stator. Such a winding arrangement allows the necessary number of windings to be applied even when the inside diameter is so small that the usual tangential windings cannot be embedded.

The rotor 4 is arranged interiorly of the stator 3, is made of ferrous metal of the desired hysteresis properties, and has a shaft 40 which is mounted on a gimbal frame 5 for rotation about the axis of rotation R. This rotor serves as the gyroscopic rotor of the device and is, according to the present invention formed with outwardly bulging sides so as to give it a substantially barrel-shaped appearance.

The gimbal frame 5 is itself mounted on the block 2 for turning movement about an axis Z by means of studs 50, 50'. This axis and the axis of rotation R are normal to each other, and both lie in the plane of the frame 5. This axis Z is the indicating axis about which the gimbal frame 5 will turn when the support is rotated about the axis of sensitivity E, the latter being normal to the plane defined by the axes R and Z.

Suitable biasing means are provided for returning the gimbal frame to its rest position. According to the present invention the biasing means comprise an annular leaf spring 6 and a disk 51 which is rotatable with the gimbal frame 5 about the indicating axis Z. The leaf spring is arranged eccentrically with respect to the axis Z, i.e., the center of the leaf spring is spaced from the axis Z. One point of the leaf spring 6 engages the disk 51 tangentially, and the leaf spring 6 and the disk 51 are secured to each other at their point of contact by a screw 61. The leaf spring 6 is attached to the base plate 1 by a screw 62, the screws 61 and 62 being arranged diametrically opposite each other.

If desired, the biasing means may be in the form of a torsion beam spring (not shown).

The stud 50' carries a conical disk 52 the conical end surface of which is separated from a corresponding countersurface 72 of a stationary damping block 7 by means of an oil film which is in communication with a closed reservoir chamber 74 by way of a bore 73 that extends in the direction of the indicating axis Z. The oil film is self-centering and acts as damping means; this damping effect can be made independent of temperature.

The barrel-shape of the rotor 4 is such as to allow it to pivot freely together with the gimbal frame 5 about the indicating axis Z, the amount of pivoting being proportional to the angular speed θ of the support about the axis of sensitivity E.

It will be appreciated that inasmuch as the reactive forces which occur during acceleration of the rotor 4 are taken up by the stator 3, the gimbal frame 5 need not be particularly strong; on the contrary, it can be of very light construction.

Furthermore, it will be noted that the center of mass of the rotor 4 is near the center of gravity of the gyroscopic system, so that neither the rotor 4 nor the small, light gimbal frame 5 contribute to increase the moment of inertia of the mass turning about the indicating axis Z. Consequently, the characteristic frequency of a gyroscopic system according to the present invention can easily be maintained sufficiently high.

It will be understood that each of the elements described above, or two or more together, may also find a useful application in other types of gyroscopic devices differing from the types described above.

While the invention has been illustrated and described as embodied in a gyroscopic device for measuring angular velocity, it is not intended to be limited to the details shown, since various modifications and structural changes may be made without departing in any way from the spirit of the present invention.

Without further analysis, the foregoing will so fully reveal the gist of the present invention that others can by applying current knowledge readily adapt it for various applications without omitting features that, from the standpoint of prior art, fairly constitute essential characteristics of the generic or specific aspects of this invention and, therefore, such adaptations should and are intended to be comprehended within the meaning and range of equivalence of the following claims.

What is claimed as new and desired to be secured by Letters Patent is:

1. A gyroscopic device for measuring angular velocity, comprising, in combination: a support the angular velocity of which about a predetermined axis of sensitivity is to be measured; a gimbal frame mounted on said support for pivotal movement relative thereto about an indicating axis normal to said axis of sensitivity; biasing means interposed between said support and said gimbal frame for urging the latter into a rest position; and a hysteresis motor having a stator and a rotor, said stator being rigidly connected to said support and said rotor constituting the gyroscopic rotor of the device and being mounted interiorly of said stator for rotation about an axis of rotation which is normal to the plane defined by said indicating axis and said axis of sensitivity, said rotor mounted on said gimbal frame and substantially barrel-shaped so as to allow it to pivot about said indicating axis and in said stator together with said gimbal frame.

2. A gyroscopic device for measuring angular velocity, comprising, in combination: a support the angular velocity of which about a predetermined axis of sensitivity is to be measured; a gimbal frame mounted on said support for pivotal movement relative thereto about an indicating axis normal to said axis of sensitivity; biasing means interposed between said support and said gimbal frame for urging the latter into a rest position; and a hysteresis motor having a stator and a rotor, said stator being in the form of a Gramme ring having an inner periphery and composed of soft iron laminations which are rigidly connected to said support, said stator further comprising wire windings extending in axial planes, said windings having inner portions passing through axially directed openings formed in and arranged about the inner periphery of said ring, said rotor constituting the gyroscopic rotor on the device and being mounted on said gimbal frame and interiorly of said stator for rotation about an axis of rotation which is normal to the plane defined by said indicating axis and said axis of sensitivity, said rotor being substantially barrel-shaped so as to allow it to pivot about said indicating of axis and in said stator together with said gimbal frame.

3. A gyroscopic device for measuring angular velocity, comprising, in combination: a support the angular velocity of which about a predetermined axis of sensitivity is to be measured; a gimbal frame mounted on said support for pivotal movement relative thereto about an indicating axis normal to said axis of sensitivity; biasing means interposed between said support and said gimbal frame for urging the latter into a rest position, said biasing means incorporating a connecting element rotatable with said gimbal frame about said indicating axis and having an attaching portion spaced from said indicating axis, and an annular leaf spring the center of which is spaced from said indicating axis, said spring being attached at one point thereof to said attaching portion of said connecting element and at a diametrically opposite point to said support; and a hysteresis motor having a stator and a rotor, said stator being in the form of a Gramme ring having an inner periphery and composed of soft iron laminations which are rigidly connected to said support, said stator further comprising wire windings extending in axial planes, said winding having inner portions passing through axially directed openings formed in and arranged about the inner periphery of said ring, said rotor constituting the gyroscopic rotor of the device and being mounted on said gimbal frame and interiorly of said stator for rotation about an axis of rotation which is normal to the plane defined by said indicating axis and said axis of sensitivity, said rotor being substantially barrel-shaped so as to allow it to pivot about said indicating axis and in said stator together with said gimbal frame.

4. A gyroscopic device for measuring angular velocity, comprising, in combination: a support the angular velocity of which about a predetermined axis of sensitivity is to be measured; a gimbal frame mounted on said support for pivotal movement relative thereto about an indicating axis normal to said axis of sensitivity; biasing means interposed between said support and said gimbal frame for urging the latter into a rest position, said biasing means incorporating a disk rotatable with said gimbal frame about said indicating axis, and an annular leaf spring the center of which is spaced from said indicating axis, said leaf spring at one point thereof engaging said disk tangentially and being secured to said disk at such point, said leaf spring being secured at a diametrically opposite point to said support; and a hysteresis motor having a stator and a rotor, said stator being in the form of a Gramme ring having an inner periphery and composed of soft iron laminations which are rigidly connected to said support, said stator further comprising wire windings extending in axial planes, said windings having inner portions passing through axially directed openings formed in and arranged about the inner periphery of said ring, said rotor constituting the gyroscopic rotor of the device and being mounted on said gimbal frame and interiorly of said stator for rotation about an axis of rotation which is normal to the plane defined by said indicating axis and said axis of sensitivity, said rotor being substantially barrel-shaped so as to allow it to pivot about said indicating axis and in said stator together with said gimbal frame.

References Cited in the file of this patent
UNITED STATES PATENTS

| | | |
|---|---|---|
| 1,802,108 | Chessin | Apr. 21, 1931 |
| 2,219,985 | Fischel | Oct. 29, 1940 |
| 2,704,456 | Hammond | Mar. 22, 1955 |